United States Patent
Ramachandran et al.

(10) Patent No.: US 7,228,029 B1
(45) Date of Patent: Jun. 5, 2007

(54) SHORT PULSE LASERS USING LARGE MODE AREA FIBERS AND HIGHER ORDER MODES

(75) Inventors: Siddharth Ramachandran, Hoboken, NJ (US); Jeffrey Nicholson, Chatham, NJ (US)

(73) Assignee: Furukawa Electric North America Inc., Norcross, GA (US)

( * ) Notice: Subject to any disclaimer, the term of this patent is extended or adjusted under 35 U.S.C. 154(b) by 120 days.

(21) Appl. No.: 11/230,905

(22) Filed: Sep. 20, 2005

(51) Int. Cl.
G02B 6/26 (2006.01)
G02B 6/02 (2006.01)
H01S 3/30 (2006.01)

(52) U.S. Cl. .................. 385/28; 385/27; 385/123; 385/127; 372/6

(58) Field of Classification Search ............ 372/6; 385/27, 28, 123, 127
See application file for complete search history.

(56) References Cited

U.S. PATENT DOCUMENTS

2003/0002794 A1* 1/2003 Ramachandran ............ 385/37
2005/0100280 A1* 5/2005 Ramachandran ............ 385/37

FOREIGN PATENT DOCUMENTS

EP 959374 A1 * 11/1999
EP 1499045 A2 * 1/2005

OTHER PUBLICATIONS

Bend Resistance of Large-Mode-Area Higher-Order-Mode Fibers, J. M. Fini and S. Ramachandran, 2006 IEEE/LEOS summer topical meeting on fibers for lasers.*
S. Ramachandran, J. Nicholson, S. Ghalmi, M. Yan, P.Wisk, E.Monberg, and F. Dimarcello, "Robust, Single-Moded, Broadband Transmission and Pulse Compression in a Record Aeff (2100 um2) Higher-Order-Mode Fiber," European Conference on Optical Communications p. Postdeadline Th4.4.1 (2005).*

* cited by examiner

Primary Examiner—George B. Nguyen
Assistant Examiner—Xinning Niu
(74) Attorney, Agent, or Firm—Michael A. Morra; Peter V.D. Wilde

(57) ABSTRACT

The specification describes an optical fiber device for propagating and recompressing high energy, ultrashort pulses with minimal distortions due to nonlinearity. The device is based on propagation in a higher order mode (HOM) of a few-moded fiber. Coupling into the HOM may be accomplished using long-period gratings. Features of the HOM fiber mode that are useful for high quality pulse compression include large effective area, high dispersion and low dispersion slope. In a preferred case the long period gratings go through a turn-around point (TAP) at the wavelength of operation.

20 Claims, 6 Drawing Sheets

SHORT PULSE LASERS USING LARGE MODE AREA FIBERS AND HIGHER ORDER MODES

FIELD OF THE INVENTION

This invention relates to optical fiber devices, such as lasers and amplifiers, that produce high power levels through the use of large effective mode area. More specifically, the devices derive improved performance characteristics when the fiber device is deliberately operated in a higher order mode.

BACKGROUND OF THE INVENTION (Parts of the following section may not be prior art.)

Fiber lasers with high pulse energy, good beam quality and excellent optical characteristics have applications in many fields and industries such as analytical spectroscopy (fluorescence, absorption), illumination, remote sensing and environmental spectroscopy (wind speed, biohazards, ecosystem mapping etc), ranging and targeting (collision avoidance, military applications etc) and scientific instrumentation. Fiber lasers with exceptionally short pulse widths, for example, femtosecond fiber lasers, have special applications in these and other fields.

There has been great progress in developing short pulse fiber lasers. However, one of the difficulties associated with femtoseconds pulses in fibers is amplifying the pulses to high power levels. Nonlinearities in the fiber cause distortions in the spectrum, and prevent compression and propagation of high energy pulses.

A number of approaches have been developed to get around this problem. One successful technique is to amplify the ultrashort pulse in a multimode fiber. By exciting only the fundamental mode of the fiber, a large effective area can be used, thereby reducing the impact of nonlinearities.

Another possibility is to use stretched pulse amplification, where the ultrashort pulse is first stretched by many orders of magnitudes, temporally broadening the pulse and decreasing the peak power, thus eliminating or reducing nonlinear interactions. However, the pulse must ultimately be re-compressed after amplification, and the high pulse energies mean the recompression stage is usually done using bulk optics.

A fiber that is capable of propagating and compressing high energy femtoseconds pulses would then be desirable for two reasons. First, if the fiber can be designed with an appropriate dispersion, it could serve as the post compression stage for the stretched, amplified pulses. Second, if the compression function can be implemented in a fiber, it can also serve as a delivery fiber for ultrashort pulses for applications such as use in an endoscope.

STATEMENT OF THE INVENTION

The invention in general is an optical fiber device for propagating and recompressing high energy, ultrashort pulses with reduced distortions due to nonlinearity. The device is based on propagation in a higher order mode (HOM) of a few-moded fiber. Coupling into the HOM may be accomplished using long-period gratings. Properties of an HOM fiber mode that are useful for high quality pulse compression include large effective area, high dispersion and low dispersion slope. In a preferred case the long period gratings go through a turn-around point (TAP) at the wavelength of operation. In other preferred embodiments, a large effective area, large enough to maintain nearly linear pulse compression, is realized using a double clad-structure. In this structure the HOM propagates in an inner cladding region. Preferably the HOM section of the device provides spectral phase $-\Phi(\omega_0)$ approximately equal and opposite to the spectral phase of the optical pulses at the input of the HOM section.

DETAILED DESCRIPTION

Figure 1:
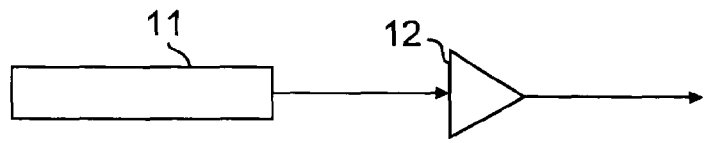
FIG. 1 is a schematic diagram of a femtosecond fiber laser based on an erbium fiber amplifier.
Figure 2:
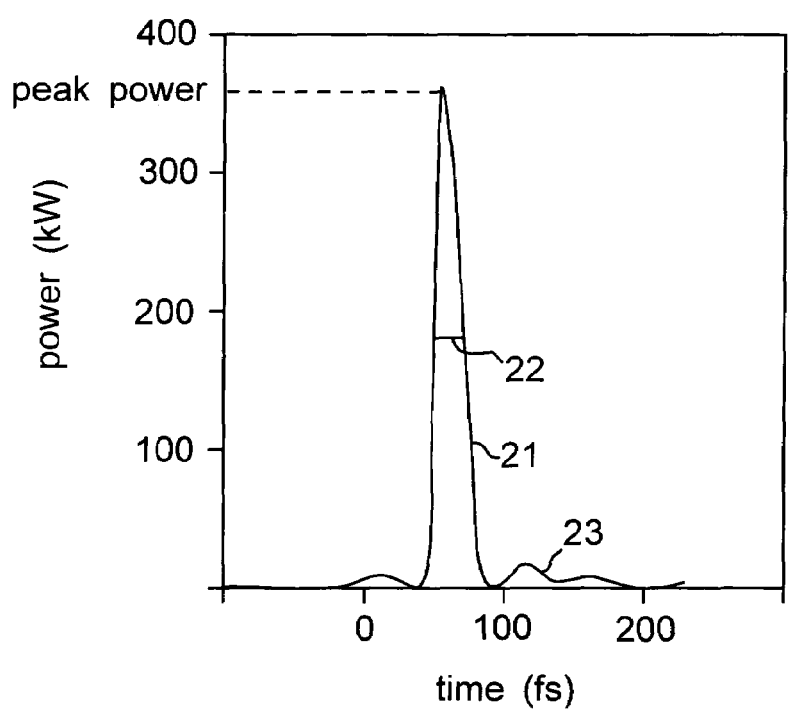
FIG. 2 is a plot illustrating definitions used in the following description.

We have recently demonstrated an erbium amplifier for amplifying femtosecond pulses from a femtosecond fiber laser at 1580 nm. This is described in U.S. patent application Ser. No. 11/105,850, filed Apr. 4, 2005, which is incorporated herein by reference. The amplifier works on the principle of self-similar propagation, and the output of the amplifier are pulses that are highly stretched, and have nearly linear chirp. A schematic of the amplifier is shown in FIG. 1, where the output of laser 11 is directed through the fiber amplifier 12. For the purposes of this work, the pulse quality, Q, is defined as the ratio of the energy in the central (strongest) pulse to the energy contained in the entire pulse, including any pedestal or satellite pulses. An illustration of these definitions is shown in FIG. 2. The main pulse body is shown at 21, and the pedestal pulses at 23. The full-width half maximum point is shown at 22. An ideal pulse would have a Q of 1. A high Q is an important requirement for many applications of femtosecond pulses. In one example, using a single mode fiber (SMF) for the compression stage, a maximum Q of 0.55 was measured, meaning 45% of the pulse energy was effectively lost in the picosecond pedestal and did not contribute to the peak power of the pulse.

Figure 3:
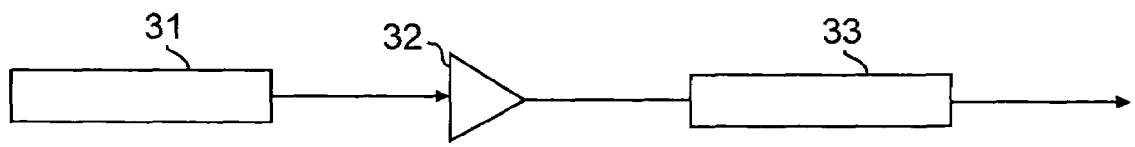
FIG. 3 is a schematic diagram of the femtosecond fiber laser of FIG. 1 combined with a pulse compression stage.

A schematic of a fiber laser and a compressor stage is shown in FIG. 3. The femtosecond laser is shown at 31, the amplifier stage at 32, and the compressor stage at 33.

Figure 4:
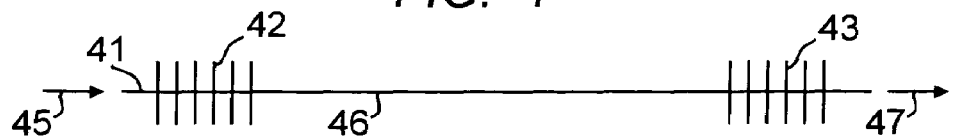
FIG. 4 is a schematic diagram of mode conversion elements useful for implementing the invention.

FIG. 4 shows a schematic of the pulse compressor stage according to an embodiment of the invention. The pulse compressor stage operates on HOMs. The pulse enters the device at 45, in the fundamental mode of fiber 41. A broadband long-period grating (LPG) 42 converts the pulse to a large effective area higher order mode (LP02, LP03, . . . , LP09, LP0,10, etc). Preferably the HOM is LP04 or higher. The length of the HOM section 46 is determined such that the HOM dispersion recompresses the pulse to a shorter width. Then a second LPG 43 reconverts the HOM to the fundamental mode and the light immediately exits the fiber at 47. Such a design allows for the delivery of high power, recompressed, pulses with a fiber, while maintaining good beam quality.

In an alternative embodiment, the compressed pulse exits the device in the HOM. Such a device comprises only the first, up-converting mode-converter (LPG on left hand side of device schematic of FIG. 4) and the HOM fiber (i.e. no output mode-converter/LPG). Light exiting such a device is in one pure spatial mode, and can thus be spatially converted to any desired transverse shape with the help of external free-space mode-transformers such as holographic films or aspherical lenses.

Figure 5:
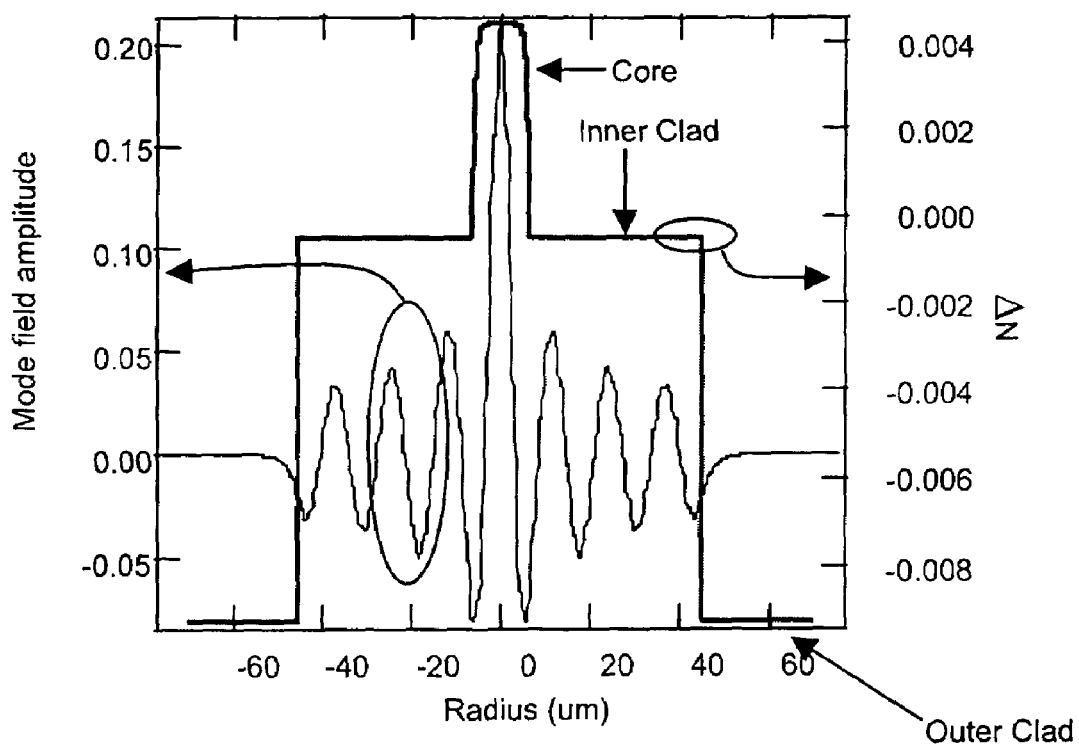
FIG. 5 is a refractive index profile as well as a mode distribution plot calculated for the LP08 mode in a HOM pulse compressed fiber.

In a preferred embodiment of the invention, the fiber that is used in the HOM compressor stage is based on a double-clad design. An example is represented in FIG. 5, where the HOM used is LP08. The index profile is plotted on the scale at the right side of the figure. The calculated mode field amplitude for the LP08 mode is also plotted using the scale on the left. The mode power dies off by r=70 microns, so loss and scattering into other modes is expected to be minimal. In this optical fiber design a significant fraction of the energy of the optical pulse is carried in the inner cladding region. Typically, in short pulse source devices using this feature, the HOM energy in the inner cladding region will be greater than that in the core. That is believed to be a distinctive aspect since, in conventional optical fibers, the largest fraction of light energy is guided by the core. The size of the combined core and cladding is large, for example, greater than r=20 microns, and the radius of the inner core is typically more than twice the radius of the core, and preferably more than 3 times the core radius. In the profile of FIG. 5 the inner cladding and the core produce a mode field diameter of more than 80 microns. A generic characterization of short pulse devices in this preferred form is that they have a mode field diameter of at least 40 microns, and preferably greater than 80 microns.

Figure 6:
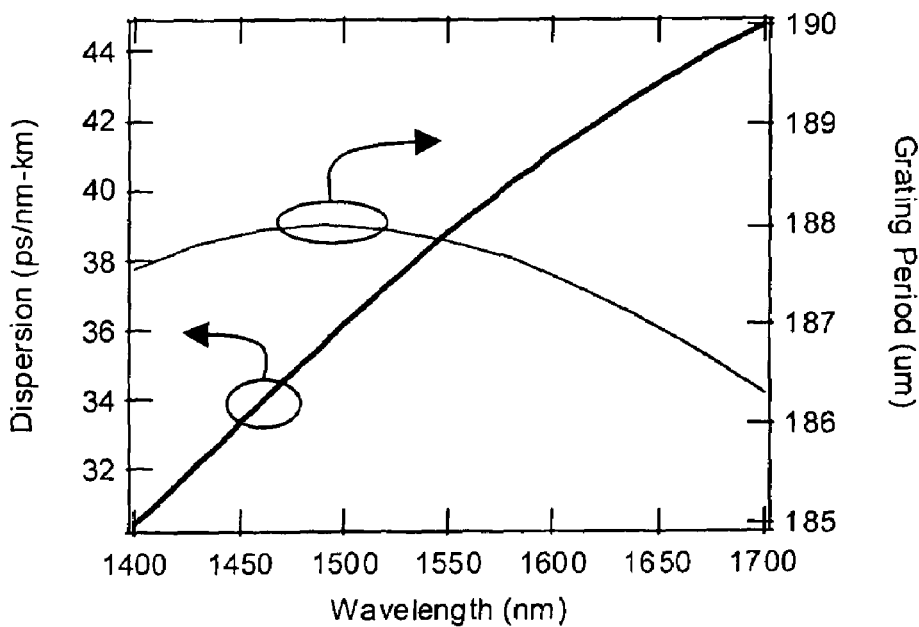
FIG. 6 is a plot showing the dispersion and grating period for the LP08 mode represented by FIG. 5.

One of the features in the design of the optical fiber in this embodiment is that the grating period goes through a turn-around point (TAP) at the wavelength of operation. TAP is defined as the wavelength region where the phase matching curve (PMC) gradient is zero. The TAP achieves the broad bandwidth useful for supporting the broad spectrum of ultra-short pulses. FIG. 6 gives a plot of the phase matching curve (PMC) for this fiber design, for coupling the fundamental mode to the desired HOM. The plot is grating period vs. wavelength, showing the TAP near 1500 nm for a grating period of approximately 188 microns (scale at right). This ensures broad bandwidth coupling of light between modes, as demonstrated by Ramachandran et al in *Optics Letters*, vol. 27, p. 698, 2002. For additional discussions of TAPs in long period gratings see U.S. Pat. No. 6,768,835, issued Jul. 27, 2004, which is incorporated herein by reference.

Also plotted in FIG. 6 is the dispersion for this fiber. The dispersion values in ps/nm-km are represented by the ascending curve and the scale at the left of the figure. The dispersion of this mode is over twice as large as SMF dispersion at 1550 nm. Relatively high dispersion is useful for achieving high quality pulse compression.

In preferred embodiments of this invention TAP gratings are used to convert the incoming energy (over a broad bandwidth) into an HOM with desired dispersion, dispersion-slope, and effective area. The fiber design shown in FIG. 5 simultaneously satisfies these requirements.

To assess the performance of the HOM pulse compressor and understand the design space, simulations of pulse propagation in the HOM fiber were undertaken. The simulations were based on the nonlinear Schrodinger equation used for modeling pulse propagation in nonlinear media. These simulations model the effects of dispersion, self phase modulation, four-wave mixing, self-steepening, and time-delayed Raman scattering. For the fiber properties, the simulations used the effective area and dispersion characteristics obtained from the index profile in FIG. 5.

Figure 7:
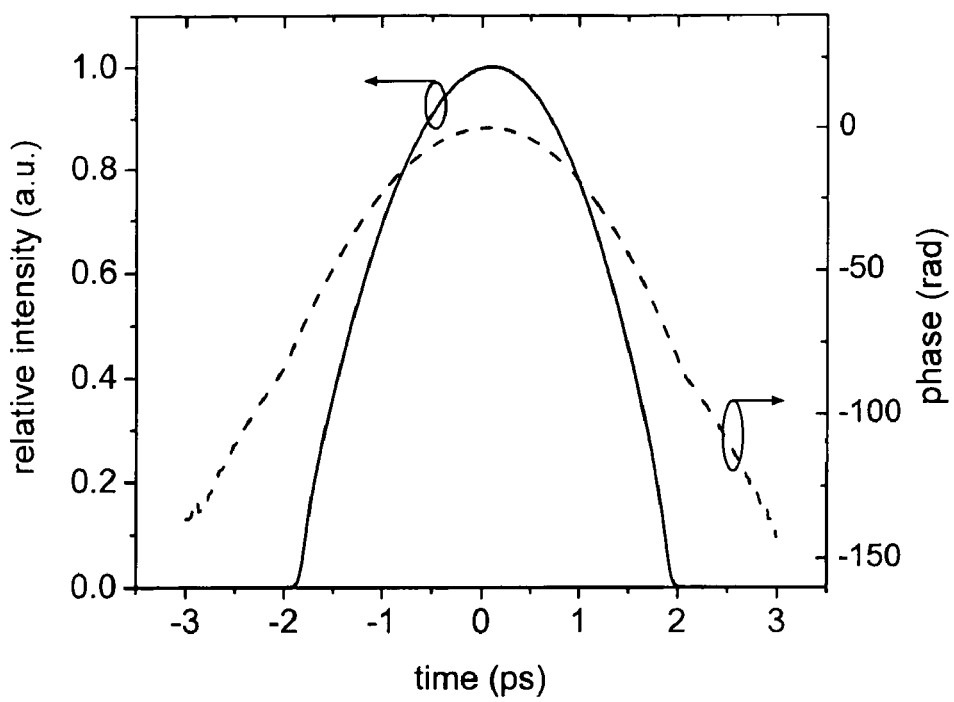
FIG. 7 is a plot showing the simulated temporal intensity and phase of the output from the laser shown in FIG. 1.
Figure 8:
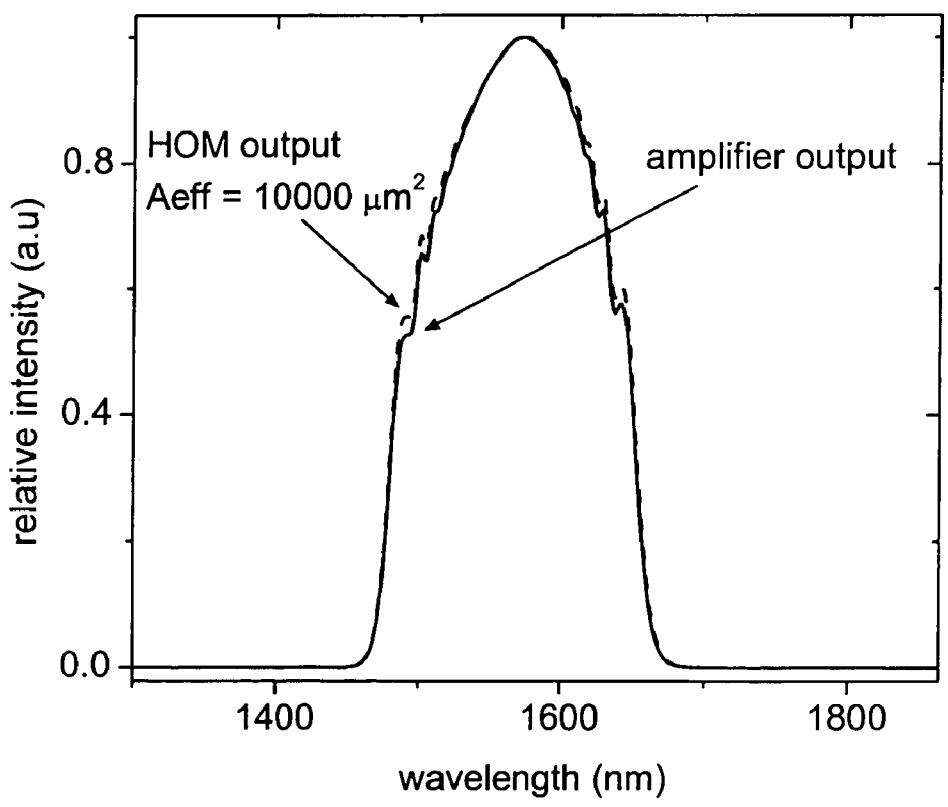
FIG. 8 is a plot comparing the output spectrum from the laser of FIG. 3 (i.e. the input spectrum for the pulse compressor stage) with the output spectrum from the pulse compressor.

First, the output pulse from the amplifier shown in FIG. 1 was simulated. The amplifier consisted of approximately 2 m of negative dispersion, highly-doped Er fiber. The output power was 500 mW and the repetition rate was 46 MHz, for a pulse energy of approximately 11 nJ. Because the fiber has negative dispersion, the amplifier operates in the parabolic pulse regime, and the temporal output of the amplifier is a highly chirped pulse with parabolic shape and quadratic phase (linear chirp). As such, these pulses are ideally compressed with linear materials with zero dispersion slope. The temporal intensity and phase and the spectrum of the output pulses from the amplifier are shown in FIG. 7 and FIG. 8. FIG. 7 plots relative intensity (solid curve) and phase (dashed curve) on a time scale. FIG. 8 plots both a spectrum in wavelength vs. intensity for both the output from the amplifier (solid curve) and the output from the HOM compressor stage (dashed curve). The effective area $A_{eff}$ of the HOM compressor fiber was 10000 $\mu m^2$. The fiber length was 2 m. Note that while the simulations detailed below are specific to the output pulses from the fiber amplifier, the HOM pulse compressor device can be designed for use with a wide range of pulse sources.

As may be inferred from the data of FIG. 8 there is minimal distortion seen between the spectrum output from the amplifier and after propagation through the HOM fiber. This confirms that for such large effective areas, the fiber acts in a linear fashion even for high peak power pulses.

Figure 9:
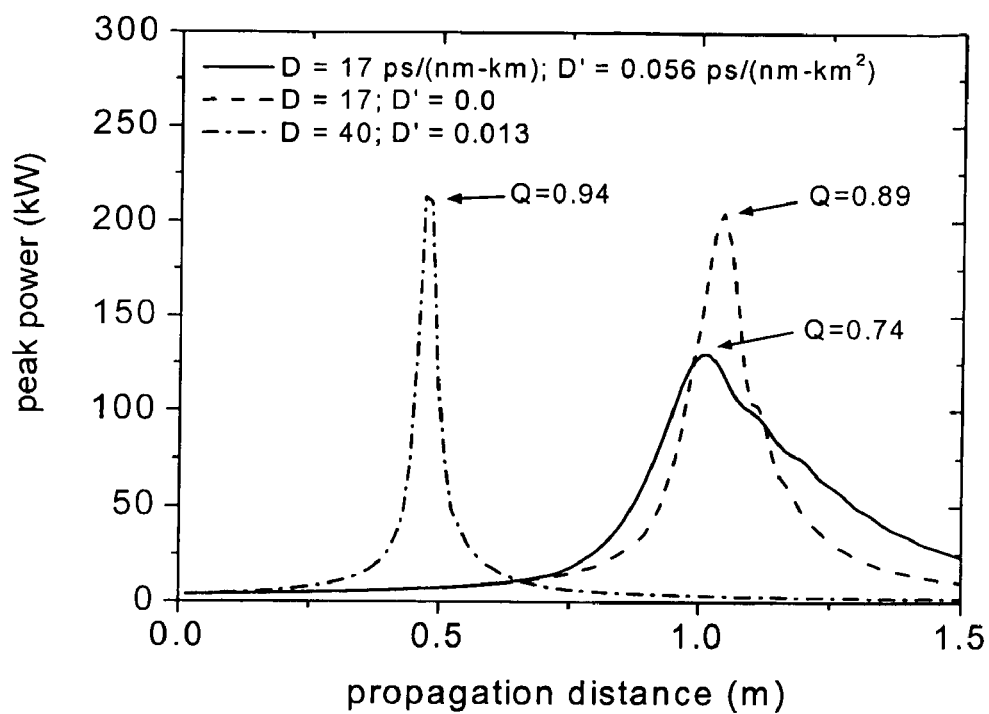
FIG. 9 shows peak power as a function of propagation distance in the pulse compressor, for an effective area A equal to 10000 $\mu m^2$, giving peak power for different dispersion values.

FIG. 9 shows how the peak power varies as the pulses propagate through the compressor fiber for an effective area of 10000 $\mu m^2$, and for different values of dispersion (D) and dispersion slope (D'). For the shortest possible pulse at the output of the compressor fiber, the length can be trimmed to the point of maximum peak power.

At the point of maximum peak power, the Q for the pulse was calculated and is also shown in FIG. 9. It can be seen that higher dispersion values give a higher Q value. In addition, dispersion slope strongly affects the Q value that can be obtained from the compressor fiber.

Figure 10:
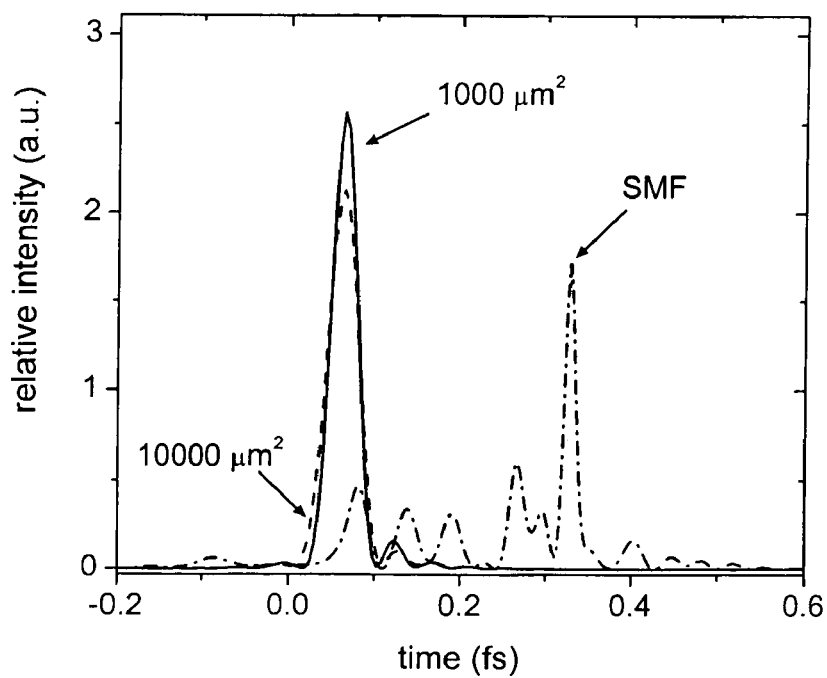
FIG. 10 is a plot showing the intensity of output pulses from the HOM pulse compressor for the case of single mode fiber and for fiber with effective A equal to 10000 $\mu m^2$ and 1000 $\mu m^2$.
Figure 11:
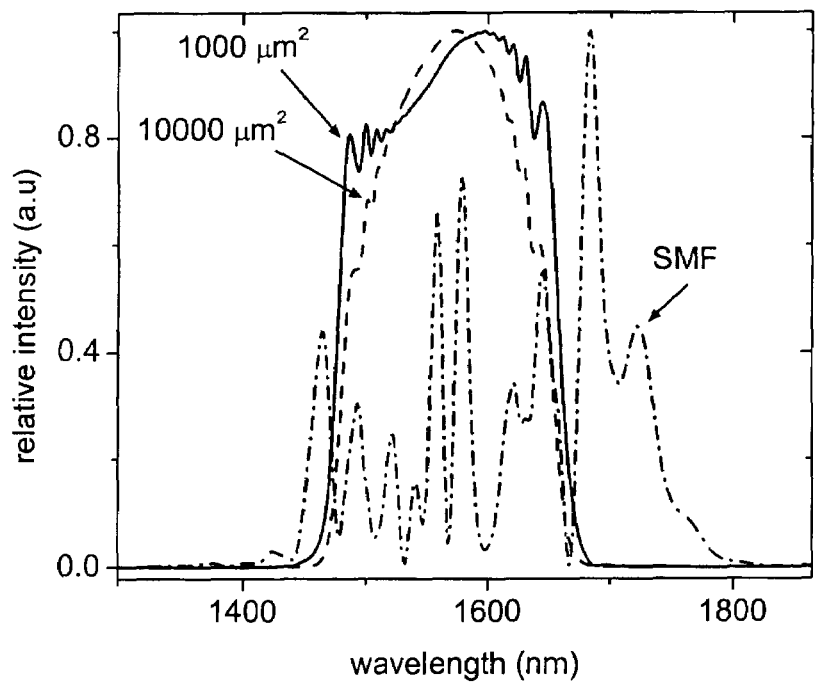
FIG. 11 shows the output spectra for the examples given in FIG. 10.

FIG. 10 shows the temporal output pulses at the point of maximum compression for different effective area fibers. The HOM fibers had a dispersion and dispersion slope of 40 ps/(nm-km) and 0.013 ps/(nm$^2$-km) respectively. For the 1000 $\mu m^2$ (solid curve) and 10000 $\mu m^2$ (dashed curve) fibers the compressed pulse consists of a single peak with a small background. The corresponding output spectra are shown in FIG. 11. Only slight changes are seen in the spectrum for the two fibers. In contrast, SMF (Aeff=80 μm², D=17 ps/(nm-km) and D'=0.056 ps/(nm²-km)) shows a significant amount of temporal structure (FIG. 10), and large changes in the spectrum (FIG. 11).

Figure 12:
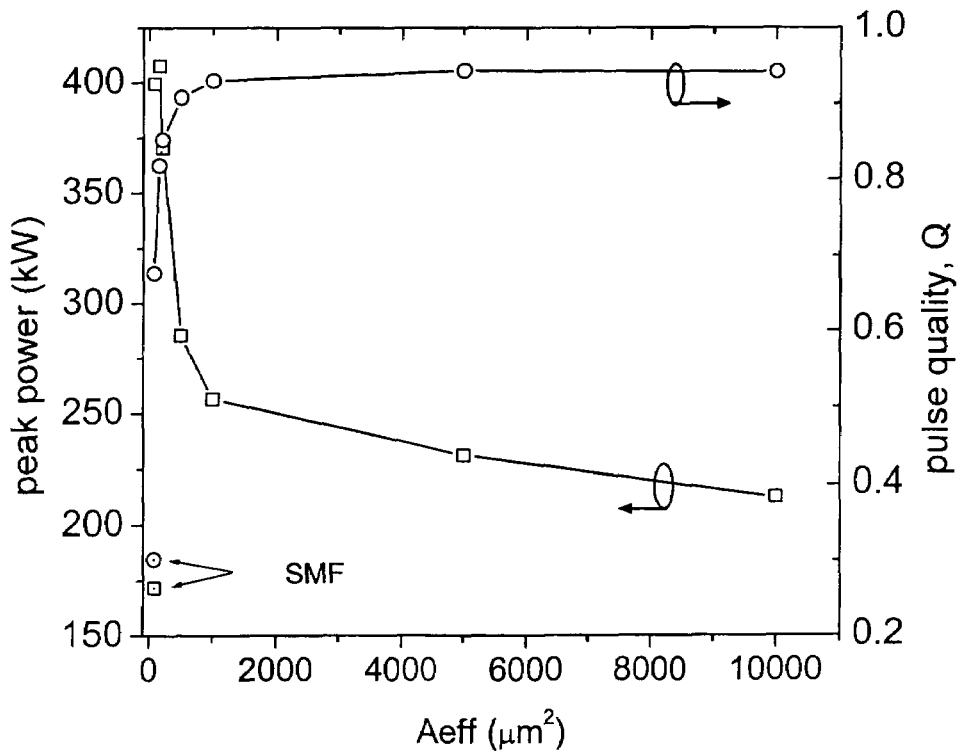
FIG. 12 is a plot of peak power and pulse quality vs. A, at the point of optimal compression.
Figure 13:
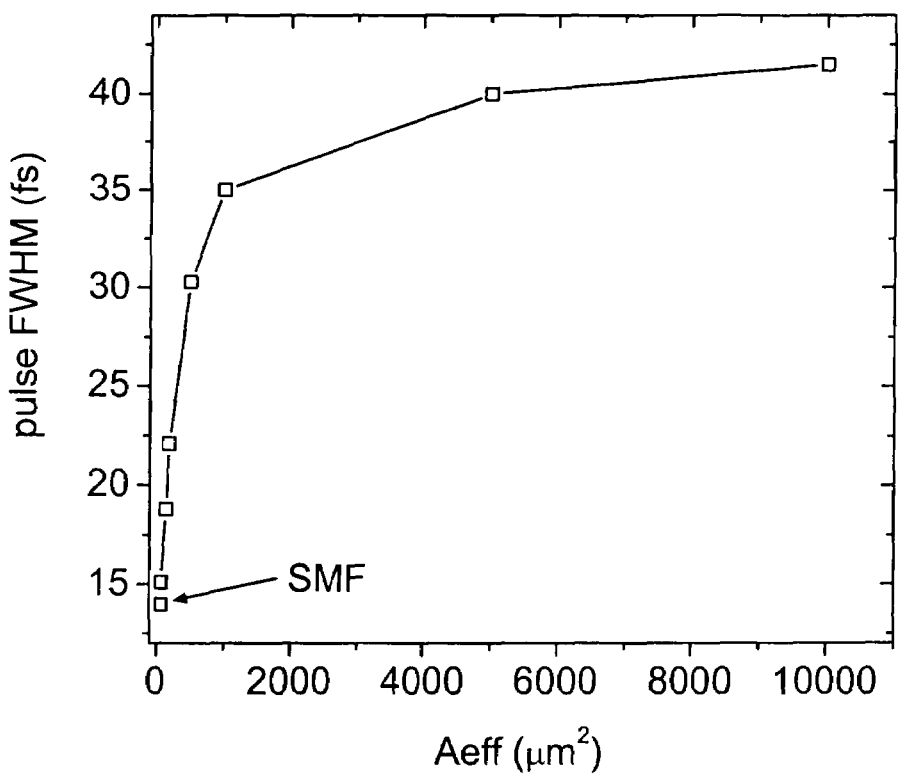
FIG. 13 is a plot of pulse full-width half maximum vs. A, at the point of optimal compression.

In order to further quantify these effects, the pulse peak power, quality, and FWHM are plotted as a function of $A_{eff}$. Results for peak power (kW) and phase quality Q are given in FIG. 12. Results for FWHM are shown in FIG. 13. For comparison, the results in each case for SMF are plotted as well. For very large effective areas, the pulse quality does not change a great deal, whereas the peak power increases and the pulse shortens as the effective area decreases. This points to a benefit gained by a certain amount of nonlinearity, as SPM broadens the spectrum slightly. This broadening can be seen in FIG. 11, where the spectrum of the 1000 μm² area fiber is slightly broader than the spectrum from the 10000 μm² fiber. However, below 1000 μm², the pulse quality begins to rapidly fall off as detrimental nonlinear effects come into play. In comparison, SMF performs poorly in both peak power and pulse quality. While other factors may influence this behavior in different designs the effective area $A_{eff}$ will generally be greater than 350 μm², preferably greater than 1000 μm², and for even better results, greater than 4000 μm².

Figure 14:
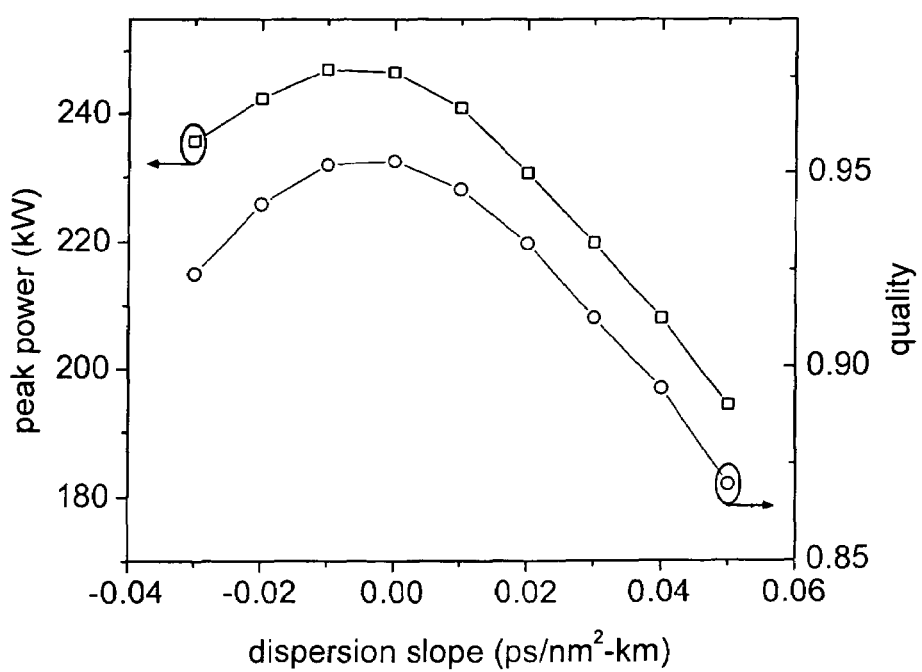
FIG. 14 is a plot of peak power and pulse quality as a function of dispersion slope.

The effect of dispersion slope was investigated. As mentioned above, the amplifier operates in the parabolic pulse regime and outputs pulses with a linear chirp. Therefore compressor fibers with low dispersion slope are expected to offer the best performance. FIG. 14 plots the pulse quality (bottom curve with circular points) and peak power (top curve with square points) as a function of a change in dispersion slope for an HOM fiber with Aeff=2000 μm² and dispersion=40 ps/(nm-km). As expected the fiber with near zero dispersion slope offers the best peak power and pulse quality. However even for large dispersion slopes of 0.04 ps/(nm²-km) the pulse quality still approaches 90%, which is significantly better than the performance achieved with SMF (see FIGS. 12 and 13). This result points to the advantages of having both a large effective area as well as a high value of dispersion. The relatively small changes in pulse quality with dispersion slope shown in FIG. 14 suggest that high quality pulses can be achieved with realistic fiber designs such as that shown in FIG. 5.

Dispersion in an optical fiber is useful for removing (or adding) a well defined spectral phase to an optical signal. In the spectral domain, the complex electric field of an optical signal is defined as $$\tilde{S}(\omega)=A(\omega)e^{i\phi(\omega)} \quad (1)$$

where S(ω) is the complex electric field, A(ω) is the spectral field amplitude, φ(ω) is the spectral phase, and ω is the angular frequency. The phase, φ(ω), can be expanded in a Taylor series around the frequency ω:

$$\phi(\omega_0)=\phi_0+\phi_1(\omega-\omega_0)+\phi_2(\omega-\omega_0)^2+ \quad (2)$$

where the coefficients $\phi_i$ are given as $$\varphi_i \left[ \frac{d^i \varphi}{d \omega^i} \right]_{\omega=\omega_0}, i=0, 1, 2... \quad (3)$$

In the case of pulses, $\phi_0$ and $\phi_1$ are not generally of great interest as a linear spectral phase corresponds simply to a time delay. However higher order spectral phases are important as they change the temporal shape of the pulse. In pulse compression, a bandwidth limited pulse is generally desired, which corresponds to achieving zero higher order phase and being left with at most a linear phase change across the spectrum.

Assuming for the moment linear propagation in the fiber and neglecting fiber loss, the effect of propagation in a fiber on the spectrum is to alter the spectral phase by the means of the propagation constant β(ω) of the fiber:

$$\tilde{S}(\omega,z)=A(\omega)e^{i[\phi(\omega)+\beta(\omega)z]} \quad (4)$$

where z is the distance of propagation along the fiber length. The propagation constant, β(ω), can also be expanded in a Taylor series similar to Eq. (2). In doing so, one can see that, given an input electric field, in order to achieve a bandwidth limited output from the fiber, the terms $\beta_i{}^*z$ must be equal in magnitude and opposite in sign to the corresponding input phase terms $\phi_i$:

$$\beta_i{}^*z=-\phi_i, i \geq 2 \quad (5)$$

The relation between fiber propagation constant β and fiber dispersion D is given by $$D = \frac{d\beta_1}{d\lambda} = -\frac{2\pi c}{\lambda^2}\beta_2 \quad (6)$$

where c is the speed of light in a vacuum and λ is the wavelength of light. In the case of broadband pulses, the wavelength variation of D usually becomes important, so one also defines the dispersion slope:

$$D' = \frac{dD}{d\lambda} = \frac{4\pi^2 c^2}{\lambda^4}\beta_3 + \frac{4\pi c}{\lambda^3}\beta_2 \quad (7)$$

If, for the moment, one restricts oneself to the case of a pulse with linear chirp, then only $\phi_2$ has a finite value and $\phi_i=0$ for i>2. To compensate such a chirp, and produce a bandwidth limited pulse with an optical fiber would require a fiber with $\beta_2{}^*z=\phi_2$ and $\beta_j=0$ for j>2. Interestingly, Eq's (6) and (7) show that a fiber designed to compensate a pulse with only linear chirp would have a finite dispersion as well as dispersion slope. The situation seems a bit incongruous, but arises because the definitions of β and φ are Taylor expansions with respect to frequency, whereas dispersion is defined as derivatives with respect to wavelength.

In this situation of compensating pulses with linear chirp, and requiring a fiber with $\beta_3=0$, using Eq. (6) and (7), the ratio of the dispersion slope to the dispersion can be written as simply $$\frac{D'}{D} = -\frac{2}{\lambda}. \quad (8)$$

For telecom wavelengths this shows that a fiber designed to compensate linearly chirped pulses has a finite, but small, slope.

In the specific case of generating pulses using a parabolic amplifier, the pulses from an ideal parabolic amplifier operating in the self similar regime are linearly chirped. The value of the linear chirp in this regime is related to only the gain per unit length of the amplifier, g, and the amplifier propagation constant $\beta_2^{amp}$:

$$\phi_2 = 3\beta_2^{amp}/g \qquad (9)$$

Using this simple expression for the chirped pulse out of the parabolic amplifier, one can design the fiber dispersion and dispersion slope using Eqs. (5), (6), and (8). These equations of course must be modified in the case of dispersion slope in the amplifier and when the pulses do not reach the asymptotic self-similar regime and when nonlinearity exists in the fiber compressor as well.

It is worth emphasizing that the fiber design shown in FIG. 5 has an effective area of 2000 $\mu m^2$. According to FIGS. 12 and 13, from the perspective of nonlinearities, the 500 mW pulses already demonstrated in the laboratory could easily be supported by a 1000 $\mu m^2$ design. However, by stretching the fiber design capabilities, to design fibers with 10000 $\mu m^2$, the technology could potentially support average powers ten times as great, for example, up to 5 W average powers at 50 MHz repetition rates.

With the benefit of the analysis of the various individual design parameters discussed above, some conditional qualitative design rules for the devices of the invention can be drawn. Quantitative limits can be extrapolated from these rules, with the understanding that optical fiber designs that differ substantially from those analyzed here may require adjustment of the quantitative recommendations. The qualitative recommendations are: large effective area, relatively high dispersion, low dispersion slope. As already mentioned, preferred values for $A_{eff}$ are: greater than 400 $\mu m^2$, preferably greater than 1000 $\mu m^2$, and for even better results, greater than 4000 $\mu m^2$. The dispersion is preferably greater than 10 ps/(nm-km). The dispersion slope is preferably less than 0.05 ps/(nm$^2$-km). The dispersion and dispersion slope are related, in that relatively higher values of dispersion slope can produce desirable results if the dispersion is relatively high. Conversely, relatively low values of dispersion produce good results with low dispersion slope values. Accordingly these parameters can be expressed in terms of a recommended ratio, for example, a ratio of dispersion slope to dispersion of less than 0.001.

While the mode converters shown in FIG. 4 for converting the incoming, and optionally the outgoing, signals between modes are long period gratings, the mode converters may be of any suitable design. The preferred choices are in-fiber grating mode converters. Alternatively, holographic free-space mode converters, or tapered hollow-core fibers, may be employed. More specifically, the preferred choice for obtaining the mode-converting device functionality is with a broadband long period fiber grating (LPG). The LPG may be induced in the HOM fiber itself, enabling a low cost, low loss, mode-converting device. Broadband mode converters are known that cover a wavelength range as large as 500 nm. For more details see S. Ramachandran, M. Yan, E. Monberg, F. Dimarcello, P. Wisk and S. Ghalmi, "Record bandwidth microbend gratings for spectrally flat variable optical attenuators," *IEEE Photon. Tech. Lett.*, vol. 15, pp. 1561-1563, 2003; S. Ramachandran, U.S. Pat. No. 6,768,835, both of which are incorporated by reference herein.

In the embodiment of FIG. 4 the input signal is converted to a HOM (using LPGs in this case) and the output from the compressor stage is converted back to a lower order mode (LOM), or the fundamental mode (LP01). Hence, the light exiting the device is in the LOM. For some applications, the output from the pulse compressor stage may remain in the HOM. For example, the output may remain in the HOM and be used as the input for a second stage of a two-stage device such as an amplifier.

Whereas it is shown or may be inferred that the output from the short pulse device of the invention is coupled to an optical fiber, it may by coupled to any suitable medium, for example, an optical integrated circuit (OIC). The output may also be propagated in free space, using standard collimating lenses, or be converted into any desired beam shape with the use of free-space beam transformers. The prospect of free-space collimation and propagation of the HOM is especially attractive for high power communications applications, where low divergence angles produce efficient collimation. The HOM mode in a fiber is less divergent than the fundamental mode, and thus suited for this application.

Methods for making optical fibers with profiles like that of FIG. 5 are well known and well developed. The core region generally consists of silica doped with germanium at concentrations less than 10 wt % at the position of maximum index, and graded with radius to provide the shape desired. The center core is typically has a radius of less than 20 microns. The inner cladding region may be undoped, or lightly doped.

In the devices described above the input for the device may be LP01 or may be a HOM that is converted to a higher HOM. For example, the input may be LP02, and the mode conversion to LP08, for example. The output, instead of converting back to LP01, may be used in the HOM.

The HOMs mentioned above as preferred modes are LPy where y is 04 or greater, or 04-10. Also suitable for the invention are LP1y modes, where y is 4 or greater, or 4-10. Thus the recommended modes are LPx,y where x is 0 or 1, and y is 4 or greater, or 4-10.

Also, in the devices described above the compression stage follows the short pulse generator. The compression stage may also be used at other places in an optical fiber system. For example, optical pulses traveling a considerable distance may spread due to the transmission characteristics of the optical fiber. A pulse compression stage may be useful in conjunction with a repeater stage amplifier, or at the remote terminal of the system.

While in principle the devices described here may function over a wide band of pulse frequencies and pulse length, the invention is preferably directed to devices where the pulses are femtosecond pulses (i.e. less than 1 picosecond). In preferred embodiments the pulses are less than 200 femtoseconds.

Alternatively, the invention is useful in applications where the pulse length is infinite, i.e. in a CW mode.

In addition to providing effective pulse trains, the method and device of the invention can also provide gain. This is described in U.S. patent application Ser. No. 11/105,850, filed Apr. 4, 2005, referenced earlier. Any of the fiber sections of the device may be doped with, for example, erbium to provide gain.

Various other modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method comprising:
   (a) generating pulses of light with wavelength $\lambda$,
   (b) propagating the pulses in an optical fiber wherein the optical pulses propagate in a lower order mode (LOM),
   (c) converting the LOM to a higher order mode (HOM), (d) propagating the HOM pulses in an HOM optical fiber having:
(i) an effective area greater than 350 µm$^2$,
(ii) a ratio of dispersion slope to dispersion such that it provides spectral phase $-\Phi(\omega_0)$ approximately equal and opposite to the spectral phase of the optical pulses at the input of the second optical fiber section.

2. The method of claim 1 wherein the HOM is LPx,y where x is 0 or 1, and y is 2-10.

3. The method of claim 2 wherein x is 0 and y is 4 or greater.

4. The method of claim 1 wherein the absolute value of the ratio of the dispersion slope to dispersion is approximately 2 divided by the pulse wavelength λ.

5. The method of claim 1 wherein the HOM pulses are converted to a LOM.

6. The method of claim 1 wherein the HOM optical fiber has a core, an inner cladding, and an outer cladding, and the optical energy propagating in the inner cladding is greater than the optical energy propagating in the core.

7. The method of claim 1 wherein the LOM is converted to HOM using a long period grating (LPG).

8. The method of claim 7 wherein the LPG has a turn around point (TAP) at a wavelength of approximately λ.

9. The method of claim 1 wherein the second optical fiber section has an effective area greater than 1000 µm$^2$.

10. The method of claim 1 wherein the pulses are amplified to provide gain.

11. A device comprising:
(a) an optical pulse generator for generating optical pulses with pulse length L, wavelength λ, and spectral phase $+\Phi(\omega_0)$,
(b) a first optical fiber section having an input and output with the input coupled to the optical pulse generator, and wherein the optical pulses in the first optical fiber section propagate in a lower order mode (LOM),
(c) a mode converter coupled to the output of the first optical fiber section for converting the LOM to a higher order mode (HOM)
(d) a second optical fiber section having an input and output with the input coupled to the mode converter, and wherein the optical pulses in the second optical fiber section propagate in a higher order mode (HOM), the second optical fiber section having:
(i) an effective area greater than 350 µm$^2$,
(ii) a ratio of dispersion slope to dispersion such that it provides spectral phase $-\Phi(\omega_0)$ approximately equal and opposite to the spectral phase of the optical pulses at the input of the second optical fiber section.

12. The device of claim 11 wherein the second optical fiber section supports HOM LPx,y where x is 0 or 1, and y is greater than 2.

13. The device of claim 12 wherein x is 0 and y is 4 or greater.

14. The device of claim 11 wherein the ratio of the dispersion slope to the dispersion is approximately 2 divided by the pulse wavelength λ.

15. The device of claim 11 additionally including a mode converter for converting the HOM pulses to LOM pulses.

16. The device of claim 11 wherein the mode converter is a long period grating (LPG).

17. The device of claim 16 wherein the optical pulse generator generates pulses with a wavelength λ and the LPG has a turn around point (TAP) at a wavelength of approximately λ.

18. The device of claim 11 wherein the HOM optical fiber has a core, an inner cladding, and an outer cladding, and wherein the inner cladding extends to a radius of at least 20 microns, and the inner cladding and the core produce a mode field diameter of at least 40 microns.

19. The device of claim 11 wherein the second optical fiber section has an effective area greater than 1000 µm$^2$.

20. The device of claim 11 wherein one or more of the fiber sections of the device are doped to provide gain.

* * * * *